Nov. 27, 1951     R. N. CLOSE     2,576,331
BOMBSIGHT COMPUTER
Filed Nov. 27, 1945
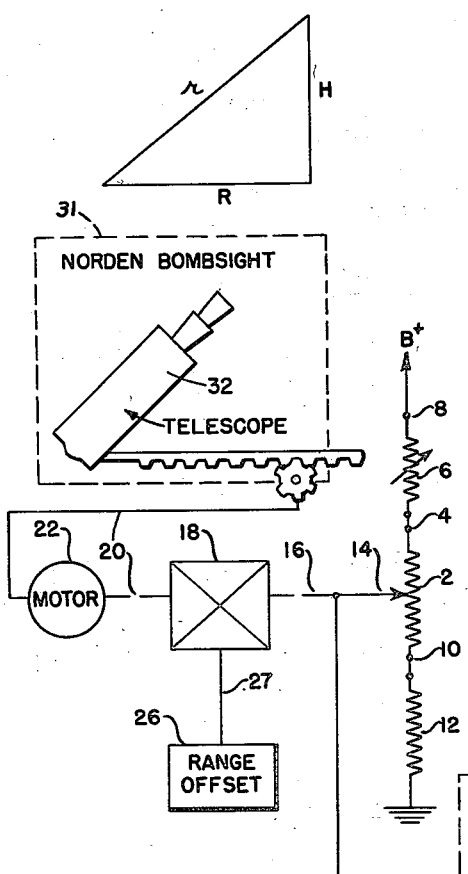
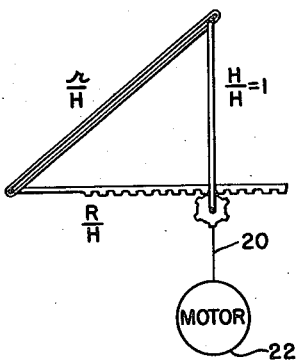
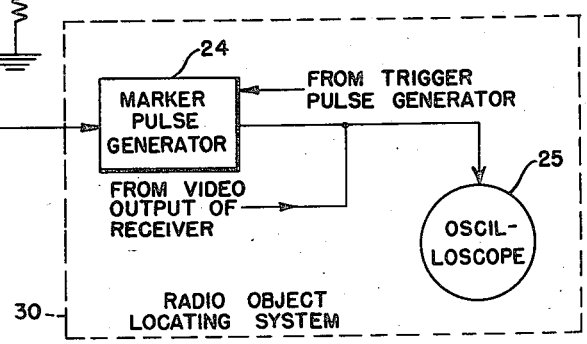
INVENTOR
RICHARD N. CLOSE
BY
ATTORNEY Patented Nov. 27, 1951

2,576,331

UNITED STATES PATENT OFFICE 2,576,331

BOMBSIGHT COMPUTER

Richard N. Close, Boston, Mass., assignor, by mesne assignments, to the United States of America as represented by the Secretary of War Application November 27, 1945, Serial No. 631,172

8 Claims. (Cl. 33—46.5)

1

The present invention relates to a computer and it relates more particularly to a computer adapted to solve right triangles.

One application of such a computer is in an aircraft bombing system such as, for example, the conventional Norden bombing system. In the present Norden bombsight, the bombing variables are set up in the form of a mechanical triangle and this triangle is continuously solved. One leg of this mechanical triangle corresponds to the altitude H of the aircraft, the second leg corresponds to the ground range R to a target to be bombed, and the hypotenuse of the triangle corresponds to the slant range $r$ of the aircraft. The Norden bombsight incorporates a telescope which is driven by a system of gears so that as the target is approached and the geometry of the triangle changes, the elevation angle of the telescope varies in such a manner that the target is continuously tracked by the telescope crosshairs.

The instantaneous pointing of the telescope is always along the slant range vector $r$ (hypotenuse of the triangle). In order that this mechanical triangle may change in shape so as to correspond to the bombing triangle, the mechanical arrangement is such that a pinion gear on the shaft of a motor engages a rack gear which forms one leg of the mechanical triangle so as to decrease the side R of the model triangle as the aircraft approaches the target. The speed of the motor is then adjusted until the telescope follows (i. e., "tracks") the target.

Under poor visual conditions it is very difficult and, in fact, often impossible to sight the target through the telescope, and hence it is desirable to utilize a conventional radio object locating apparatus to determine when the telescope is "looking" at the target. In order to accomplish this, it is necessary that there appear on the screen of the oscilloscope, which forms an integral part of the radio object locating apparatus, a range marker which corresponds at any instant to the slant range from the bombing aircraft to the target. As the target to be bombed appears as a bright spot on the oscilloscope screen, the marker may be superimposed on the "target" and the position of said marker may be determined by a voltage proportional to the slant range from the aircraft to the target.

It is therefore an object of the present invention to provide a computer adapted to synchronize a target sighting device, such as a Norden bombsight, with a radio object locating apparatus.

2

It is another object of the present invention to provide an automatic computer which is adapted to provide a voltage substantially proportional to the slant range from an aircraft to a target.

The present invention may be more fully understood from the following detailed description when taken into consideration with the accompanying drawing wherein:

Fig. 1 shows the geometry of the bombing triangle to be solved;

Fig. 2 shows a schematic mechanical model of the triangle; and

Fig. 3 is a circuit diagram of one embodiment of the present invention.

As one object of the present invention is to provide a computer adapted to synchronize the conventional Norden bombsight with a conventional radio object locating apparatus, the above described mechanical triangle is also employed in the present invention. By reference to Fig. 1, it can be seen that as the altitude of the aircraft changes it is inconvenient to provide a mechanical triangle which has both a variable side H and a variable side R. Therefore, the system is "normalized" with respect to the altitude H. By normalizing with respect to H, it is meant that the side H of the triangle always remains fixed and the remaining sides of the triangle are made to change correspondingly. This can be seen from Fig. 2 which represents a mechanical model of the triangle shown in Fig. 1 except that each side has been divided through by H, thereby making the altitude of the triangle equal to unity.

It is thus apparent that in order to solve the triangle, the rack gear forming one leg of the triangle must change in accordance with the ratio R/H. If then a voltage can be obtained which is proportional to the slant range $r$, this voltage may be used to control the position of a marker which appears on the oscilloscope screen. Then by adjusting the speed of the motor so that the marker always remains on, or tracks the target to be bombed, the triangle will be continuously computed and the Norden telescope will always "look" at the target. The motor shaft angular rotation or displacement which is in terms of the bombing variables R/H is utilized to generate the desired voltage proportional to the slant range $r$.

Reference is made to Fig. 3 which shows a schematic circuit diagram of one embodiment of the present invention. A conventional radio object locating system is indicated by the broken-line box designated 30. A conventional Norden bombsight, including the conventional telescope 32, is indicated at 31. The circuit there shown enables the movement of the shaft of the driving motor associated with the mechanical triangle model to be converted into a voltage proportional to the slant range $r$. In the figure, potentiometer 2 having a special characteristic has one terminal 4 connected through variable resistance 6 to a suitable source of potential 8. Terminal 10 of said potentiometer is connected through fixed resistance 12 to ground. Movable arm 14 of potentiometer 2 is connected by shaft 16 to differential 18. Differential 18 is in turn connected by shaft 20 to motor 22, said motor being the same motor that continuously changes side R of the mechanical triangle shown in Fig. 2. As mentioned heretofore, the rotation of this motor is proportional to R/H. It is desired to have the voltage developed at movable arm 14 always proportional to the slant range $r$ of the target. The manner of accomplishing this may be readily understood from the following analysis.

Assume that the value of fixed resistance 12 is arbitrarily chosen to be proportional to a distance H, and further assume that it is desired to have the voltage, with respect to ground, at movable arm 14 of potentiometer 2 always proportional to the slant range distance $r$. The resistance between movable arm 14 and ground will hereinafter be defined as $R_{14}$ and its value will represent the distance $r$. Similarly the resistance between movable arm 14 and terminal 10 may be defined as $R_{10}$ and the resistance of fixed resistance 12 may be defined as $R_{12}$. Thus it will be seen that $$R_{10} + R_{12} = R_{14}$$

or $$R_{10} = R_{14} - R_{12}$$

As $R_{14}$ represents a distance $r$, and $R_{12}$ represents a distance H, and, from Fig. 1, $$r = \sqrt{R^2 + H^2}$$

the following relationship may be written:
$R_{10}$ is proportional to $$\sqrt{R^2 + H^2} - H$$

$R_{12}$ was assumed to be proportional to H, then the actual resistance of $R_{10}$ may be determined from the following proportion:

$$\frac{R_{12}}{H} = \frac{R_{10}}{\sqrt{R^2+H^2}-H}$$

and $$R_{10} = \frac{R_{12}}{H}[\sqrt{R^2+H^2}-H]$$

This last equation may be written as $$R_{10} = R_{12}\left[\sqrt{\left(\frac{R}{H}\right)^2 + 1} - 1\right]$$

In other words, it is necessary that the resistance from movable arm 14 to terminal 10 vary with $$\left(\frac{R}{H}\right)$$

according to the general law $$\sqrt{x^2+1}-1$$

where $x$ is the displacement of the movable arm above terminal 10. This is actually the case in view of the fact that movable arm 14 is connected to motor 22, and as the angular displacement of the motor rotor is proportional to R/H, the displacement of movable arm 14 is likewise proportional to R/H. Thus, the resistance between movable arm 14 and terminal 10 is a function of the ground range R and the altitude H.

Now considering voltages developed by a current I across $R_{14}$, $R_{10}$ and $R_{12}$ where similar notations are used, $$V_{14} = V_{10} + V_{12}$$

$$V_{14} = I\left[\frac{R_{12}}{H}(\sqrt{R^2+H^2}-H) + R_{12}\right]$$

$$V_{14} = I\left[\frac{R_{12}}{H}(r-H) + R_{12}\right]$$

$$V_{14} = IR_{12} \cdot \frac{r}{H}$$

or $$V_{14} = V_{12} \cdot \frac{r}{H}$$

As $R_{12}$ was arbitrarily chosen as representing a distance H, then for a particular current I, the voltage $V_{12}$ developed across $R_{12}$ may likewise be considered as being equal to H volts. Thus it is apparent that the voltage $V_{14}$ developed at movable arm 14 is proportional to the slant range $r$. If now the altitude H changes, it is merely necessary to change the current flowing through the circuit a corresponding amount.

Potentiometer 2 must have a characteristic which follows the general law $$\sqrt{x^2+1}-1$$

where $x$ is the displacement of movable arm 14. It is noted that this is a hyperbolic characteristic. For example, in Fig. 3 the resistance between movable arm 14 and terminal 10 of potentiometer 2 varies hyperbolically with the displacement of movable arm 14. It is to be understood that the term "a potentiometer having a hyperbolic characteristic" refers to such a potentiometer where this characteristic may be obtained in a number of well known ways. One way of doing this is to use a specially wound potentiometer or by using a linear potentiometer driven by a cam connected to shaft 16 and having a hyperbolic characteristic.

To operate the computer at a given altitude H, variable resistance 6 is set so that the current flowing through resistance 12 develops a voltage across said resistance proportional to the altitude. In view of the foregoing description, it is apparent that a voltage is thus developed at movable arm 14 which is proportional to the slant range $r$. Furthermore, as the triangle is always changing, i. e., R decreasing linearly and $r$ hyperbolically, the motor which changes side R (Fig. 2) in accordance with the ratio R/H also drives movable arm 14 whereby the voltage developed at said movable arm is always proportional to the ever changing slant range $r$.

The voltage developed at movable arm 14 is used to control the range position of the previously mentioned marker signal which appears on the oscilloscope screen in addition to the target indication. The marker signal is produced by a conventional marker pulse generator 24, for example, such as described on pages 266 to 274 in "Radar System Fundamentals," Navships 900,017, Bureau of Ships, Navy Department, 1944 (see especially section "e" on page 271), and applied to oscilloscope 25 in any usual manner. As mentioned, the voltage derived at movable arm 14 of potentiometer 2 is utilized merely to control the range position of said marker signal on the oscilloscope screen. This is accomplished by applying to generator 24 trigger pulses synchronized with the radio object locating system transmitter. A time delay proportional to the voltage at movable arm 14 is introduced into these pulses in the generator 24 and the delayed pulses are applied to the oscilloscope in parallel with the video output of the receiver of the radio object locating system.

To operate the computer at a given altitude, movable arm 14 is set to the lower extremity of the potentiometer (corresponding to terminal 10). Variable resistance 6 is then adjusted until the marker signal appearing on the oscilloscope screen appears at a range equal to the altitude of the aircraft. The voltage appearing across resistance 12 is then equal to H volts and if the altitude of the aircraft changes, variable resistance 6 should again be adjusted to cause the voltage across resistance 12 to be equal to the new H. In bombing an actual target, the speed of the motor is adjusted so that the marker signal is always superimposed on the target signal, i. e., "tracks" the target.

As the motor also controls the angular position of the telescope and as the telescope is always pointing along the slant range vector $r$ of the mechanical triangle, it is evident that the telescope is always "looking" at the target to be bombed. One obvious advantage of continuing to use the telescope is that although the target may be bombed "blindly" by means of the radio object locating system as described above, if there should be a break in the overcast as the target is approaching the telescope is pointed at the target and the bombardier may bomb by visual means.

It may be desirable to use an offset bombing technique whereby an aiming point having a known position with respect to the target is tracked rather than the target itself. The range of the aiming point will, in general, be different than the range of the target. Therefore some means must be provided whereby the mechanical triangle is still solved with respect to the actual target yet where the voltage developed at movable arm 14 of potentiometer 2 is proportional to the slant of the aiming point. This may be accomplished by means of range offset control 26 which consists of a handwheel connected to shaft 27 which in turn is connected to differential 18. Thus, the angular position of range offset control 26 causes the corresponding change of the position of shaft 16 and hence movable arm 14 of potentiometer 2. This change in position of movable arm 14 and hence change in voltage at said point corresponds to the difference in slant range between the aiming point and the actual target.

Although the triangle solver described above solves the bombing triangle having the variables $r$, $H$, and $R$, it is to be understood that other triangles having legs "$a$" and "$b$" and a hypotenuse "$c$" may also be solved by the circuit of Fig. 3.

Although there has been herein described one specific embodiment of the present invention, it will be manifest to those skilled in the art that various changes and modifications may be made therein without departing from the spirit and scope of the invention.

What is claimed is:

1. In an aircraft bombing system comprising radio object locating apparatus for indicating on an oscilloscope screen the position of a target with respect to the aircraft in terms of the height, horizontal range, and slant range, and a bombsight including a motor having a shaft for continuously varying the elevation angle of a telescope whereby said telescope may continuously track the target, a potentiometer having a resistance characteristic between its movable arm and one terminal characterized by the relationship $$\sqrt{x^2+1}-1$$

$x$ being the displacement of the movable arm with respect to said terminal, a resistance connected in series with said potentiometer, a source of potential connected across said serially connected potentiometer and resistance, means for varying the current flowing through said serially connected potentiometer and resistance whereby the voltage developed across said resistance is proportional to the height of the aircraft, means interconnecting said shaft and said movable arm for positioning said arm in accordance with the rotation of said shaft, means contained in said radio object location system for generating a marker signal, means for indicating said marker signal on the screen of said oscilloscope, and means for utilizing the voltage developed at the arm of said potentiometer to control the position of said marker signal whereby when the speed of said motor shaft is adjusted so that the marker signal is superimposed on the target signal displayed on said oscilloscope, said motor has a displacement proportional to the ratio of the horizontal range to the height and causes said telescope continuously to track the target, and the voltage developed at the movable arm of said potentiometer is proportional to the slant range of the target, thereby providing coincidence between the target signal and said marker signal.

2. In an aircraft bombing system comprising radio object locating apparatus for indicating on an oscilloscope screen the position of a target with respect to the aircraft in terms of the height, horizontal range and slant range, said apparatus having a circuit for generating an adjustable marker and for displaying said marker on said oscilloscope screen, said system including a bombsight having a telescope and a motor for continuously varying the elevation angle of the telescope whereby said telescope may continuously track said target; an electrical computer including a potentiometer having a hyperbolic characteristic, a resistance connected in series with said potentiometer, a source of potential connected across said serially connected potentiometer and resistance, means for varying the current flowing through said serially connected potentiometer and resistance whereby the voltage developed across said resistance is proportional to the height of the aircraft, means interconnecting said motor and the movable arm of said potentiometer, means for utilizing the voltage developed at the arm of said potentiometer for controlling the position of said marker signal whereby when the speed of the motor is adjusted so that the marker signal is superimposed on the target signal on said oscilloscope, the motor has a displacement proportional to the ratio of the horizontal range to the height and the voltage developed at the movable arm of said potentiometer is proportional to the slant range, thereby providing coincidence between the target signal and said marker signal, and the telescope continuously tracks the target.

3. An aircraft bombing system comprising radio object locating apparatus including an oscilloscope, and a bombsight including a telescope and a motor having a shaft displacement which is made proportional to R/H, a device for synchronizing said telescope to said radio object locating apparatus, said device including means for converting said shaft rotation into a voltage proportional to the slant range of a target, means for generating a marker signal, means for applying said marker signal to the screen of said oscilloscope, means for utilizing said slant range voltage to control the position of said marker signal on said oscilloscope screen, means for adjusting the speed of said motor so that said marker signal is always superimposed on the target signal whereby said telescope continuously tracks the target and said shaft displacement is proportional to R/H.

4. In an aircraft bombing system comprising radio object locating apparatus having an oscilloscope screen for indicating the position of a target with respect to the aircraft in terms of the height, horizontal range, and slant range and a circuit for generating and for displaying an adjustable marker signal on said oscilloscope screen, a mechanical model of the bombing triangle, and a motor for continuously varying the geometry of said mechanical triangle; an electrical computer including a potentiometer having a hyperbolic characteristic, a resistance connected in series with said potentiometer, a source of potential connected across said serially connected potentiometer and resistance, means for varying the current flowing through said serially connected potentiometer and resistance whereby the voltage developed across said resistance is proportional to the height of the aircraft, a connection between the arm of said potentiometer and said motor, means for utilizing the voltage developed at the arm of said potentiometer for controlling the position of said marker signal whereby when the speed of the motor is adjusted so that the marker signal is superimposed on the target signal displayed on said oscilloscope, the motor has a displacement proportional to the ratio of the horizontal range to the height, the voltage developed at the movable arm of said potentiometer is proportional to the slant range and the mechanical triangle model is continuously solved.

5. An apparatus for solving a right triangle wherein "a" and "b" respectively represent the legs, said leg "b" being continuously varied, and "c" represents the hypotenuse of the triangle, comprising a potentiometer having a hyperbolically characterized taper, a fixed resistance connected in series with said potentiometer, a source of potential connected across said serially connected potentiometer and resistance, means for varying the current flowing through said serially connected potentiometer and resistance to develop a voltage across said resistance which is proportional to leg "a" of the triangle, means for continuously positioning the movable arm of said potentiometer to maintain the displacement of said arm always directly proportional to $b/a$, whereby the voltage developed at the arm of said potentiometer is proportional to the hypotenuse "c" of the triangle.

6. In a system having three spatial variable coordinates, $a$, $b$, and $c$, characterized by the relationship $c^2=a^2+b^2$, wherein the equivalent equation $$c=b\left(\sqrt{\left(\frac{a}{b}\right)^2+1}-1\right)+b$$

is derived from said relationship, an apparatus for solving said equation including a shaft, means for rotating said shaft at a speed in proportion to an arbitrary adjustable parameter "X," a first means for obtaining a first voltage representing "b," a second means coupled to said shaft having means therein deriving a hyperbolic function of shaft speed for obtaining a second voltage equal to the product of said first voltage multiplied by the hyperbolic function $$(\sqrt{x^2+1}-1)$$

a third means for serially connecting said first means and said second means to obtain a third voltage equal to the sum of said first and second voltages, means for obtaining a fourth voltage representing "c" means for comparing said third voltage with said fourth voltage, and means for adjusting said parameter "X" to make said third voltage continuously equal to said fourth voltage, whereby said shaft rotates at a speed which is continuously in proportion to the instantaneous value of the ratio $a/b$.

7. In a bombing system having three spatial variable coordinates, $r$, the slant range, R, the horizontal range, and H, the height, characterized by the relationship $r^2=R^2+H^2$, wherein the equivalent equation $$r=H\left(\sqrt{\left(\frac{R}{H}\right)^2+1}-1\right)+H$$

is derived from said relationship, an apparatus for solving said equation including a shaft, means for rotating said shaft at a speed in proportion to an arbitrary adjustable parameter "X," a first means for obtaining a first voltage representing "H," a second means coupled to said shaft having means therein deriving a hyperbolic function of shaft speed for obtaining a second voltage equal to the product of said first voltage multiplied by the hyperbolic function $$(\sqrt{x^2+1}-1)$$

a third means for serially connecting said first means and said second means to obtain a third voltage equal to the sum of said first and second voltages, means for obtaining a fourth voltage representing "r," means for comparing said third voltage with said fourth voltage, means for adjusting said parameter "X" to make said third voltage continuously equal to said fourth voltage, whereby said shaft rotates at a speed in proportion to the instantaneous value of the ratio R/H, a telescope, and means coupling said telescope to said shaft whereby said telescope continuously sights the target.

8. In an aircraft bombing system which employs an offset bombing technique, said system including radio object locating apparatus having an oscilloscope; a mechanical model of the target triangle to be solved including a telescope forming the hypotenuse of said mechanical model and means coupled to said telescope forming the horizontal leg of said mechanical model; a motor having a shaft coupled to said means forming the horizontal leg of said mechanical triangle for controlling the effective length thereof in accordance with the displacement of said shaft; means for converting said shaft displacement into a voltage which is a hyperbolic function of shaft displacement; means to adjust said voltage to be proportional to the slant range of an aiming point a known distance from said target; means for generating a marker signal; means for applying said marker signal to said oscilloscope; means for controlling the position of said marker signal on said oscilloscope with said slant-range voltage; and means for adjusting the speed of said motor to maintain said marker signal always superimposed on the display of said aiming point on said oscilloscope, whereby the shaft displacement of said motor is proportional to R/H and said telescope always points in the direction of said target.

RICHARD N. CLOSE.

REFERENCES CITED

The following references are of record in the file of this patent:

UNITED STATES PATENTS

| Number | Name | Date |
| --- | --- | --- |
| 2,438,112 | Darlington | Mar. 23, 1948 |
| 2,439,381 | Darlington | Apr. 13, 1948 |
| 2,444,771 | Flyer | July 6, 1948 |

FOREIGN PATENTS

| Number | Country | Date |
| --- | --- | --- |
| 458,274 | Great Britain | Dec. 16, 1936 |
| 476,831 | Great Britain | Dec. 16, 1937 |